United States Patent
Chanteau et al.

(10) Patent No.: US 8,255,008 B1
(45) Date of Patent: Aug. 28, 2012

(54) MOBILE TERMINAL EQUIPPED WITH AUTOMATIC POWER SUPPLY

(75) Inventors: Gilles Chanteau, Punaauia Tahiti (FR); Christian Bourliataud, Plaisir (FR)

(73) Assignee: France Telecom, Paris (FR)

( * ) Notice: Subject to any disclaimer, the term of this patent is extended or adjusted under 35 U.S.C. 154(b) by 1019 days.

(21) Appl. No.: 11/995,463

(22) PCT Filed: Jul. 12, 2006

(86) PCT No.: PCT/FR2006/050715
§ 371 (c)(1),
(2), (4) Date: Jan. 11, 2008

(87) PCT Pub. No.: WO2007/007016
PCT Pub. Date: Jan. 18, 2007

(30) Foreign Application Priority Data

Jul. 13, 2005 (FR) ..................................... 05 52185

(51) Int. Cl.
*H04M 1/00* (2006.01)
*H04B 1/18* (2006.01)
(52) U.S. Cl. ..................................... 455/572; 455/162.1
(58) Field of Classification Search ............... 455/435.2, 455/435.1, 574, 456.3, 414.2, 405, 418, 572, 455/441, 436, 73, 115, 343, 127, 164.1, 162.1, 455/421, 425, 408; 340/539.22, 539.11, 340/539.1, 825.5, 547, 514, 518, 539.3
See application file for complete search history.

(56) References Cited

U.S. PATENT DOCUMENTS

| | | | | |
|---|---|---|---|---|
| 4,933,963 A * | 6/1990 | Sato et al. | ..................... | 704/224 |
| 5,671,195 A * | 9/1997 | Lee | ................................... | 369/7 |
| 6,559,833 B2 * | 5/2003 | Rowe | ........................... | 345/173 |
| 6,946,959 B2 * | 9/2005 | Wang | .......................... | 340/539.22 |
| 7,047,034 B2 * | 5/2006 | Norimatsu | ................ | 455/552.1 |
| 2003/0126927 A1 * | 7/2003 | Nozoe et al. | ............... | 73/514.16 |
| 2004/0182159 A1 * | 9/2004 | Yamada | ......................... | 73/593 |
| 2004/0203777 A1 * | 10/2004 | Watanabe et al. | .......... | 455/435.2 |
| 2004/0204158 A1 * | 10/2004 | Wang et al. | ................ | 455/569.1 |
| 2005/0187673 A1 * | 8/2005 | Mizushima et al. | ............. | 701/1 |
| 2005/0218292 A1 * | 10/2005 | Kawabe et al. | ............... | 250/206 |
| 2006/0270381 A1 * | 11/2006 | Park et al. | .................. | 455/343.2 |
| 2007/0037610 A1 * | 2/2007 | Logan | .......................... | 455/574 |
| 2007/0252693 A1 * | 11/2007 | Janson | ......................... | 340/541 |
| 2008/0161072 A1 * | 7/2008 | Lide et al. | ..................... | 455/574 |
| 2008/0174550 A1 * | 7/2008 | Laurila et al. | ................ | 345/158 |
| 2008/0274764 A1 * | 11/2008 | Masuda et al. | ............ | 455/550.1 |
| 2010/0032332 A1 * | 2/2010 | Davis et al. | ................ | 206/459.1 |

FOREIGN PATENT DOCUMENTS

| | | |
|---|---|---|
| EP | 0 812 119 | 12/1997 |
| EP | 0 833 537 | 4/1998 |
| EP | 0 952 500 | 10/1999 |
| WO | 2005 081565 | 9/2005 |

* cited by examiner

*Primary Examiner* — Melody Mehrpour
(74) *Attorney, Agent, or Firm* — Westman, Champlin & Kelly, P.A.; David D. Brush

(57) ABSTRACT

According to the invention, the terminal (10) includes means (20) for automatically supplying power to a component (15) of said terminal, said automatic power supply being controlled by means (20) for detecting movement of said terminal (10). Application to mobile terminals equipped with a radio interface.

18 Claims, 2 Drawing Sheets

MOBILE TERMINAL EQUIPPED WITH AUTOMATIC POWER SUPPLY

The present invention relates to a mobile terminal.

The invention finds an advantageous application in the field of mobile terminals, such as mobile telephones or personal digital assistants (PDA), and more specifically in the field of mobile telephones equipped with a radio interface intended in particular to detect the presence of a mobile radio communication network.

Generally speaking, mobile terminals use an onboard battery to supply power to the components necessary for their operation and to provide the services they are intended to offer their users.

However, that mode of providing an electrical power supply is not totally satisfactory because of the relative short battery life of the batteries used in mobile terminals and also because of the increasing number of components, some of which, for example those associated with scanning for a radio network, account for a large share of the overall electrical power consumption balance of the terminals.

A partial solution to this problem is to put the terminals on standby when, although switched on, they are not in operation. This is usually effected after a time delay. The change from the standby mode to the active mode then requires action at the terminal, which represents a constraint for the mobile terminal user.

Thus the technical problem to be solved by the subject matter of the present invention is to propose a mobile terminal equipped with an electrical power supply system for supplying power to the components of said mobile terminal, in particular those of high power consumption, only when the terminal is in motion, without intervention of the user and if a particular condition is satisfied.

The solution in accordance with the present invention to the stated technical problem consists in said terminal including means for automatically supplying power to at least one component of said terminal, said automatic power supply being controlled by means for detecting movement of said terminal.

Thus said component can change automatically from the standby mode to the active mode as soon as it is established that the terminal is in motion following detection of movement of the terminal.

Note also an advantage of the invention, namely the reversible nature of the activation of the component, which is also de-activated automatically when movement of the terminal is no longer detected.

According to a first embodiment of the invention, said automatic power supply means comprise a battery adapted to be connected to said component by said means for detecting movement of the terminal.

Said battery is advantageously a power supply battery of the terminal.

Two implementation modes of this first embodiment can be envisaged.

According to a first implementation mode, said movement detection means comprise a vibration detector supplied with power by said battery.

According to a second implementation mode, said movement detection means comprise an autonomous vibration detector. This solution has the advantage over the previous solution of not using the battery of the terminal to supply power to the vibration detector, leading to a power saving even if the power consumption of the detector supplied with power by the battery is very low.

In particular, said autonomous vibration detector is a vibration-based electrical generator.

According to a second embodiment of the invention, said automatic power supply means consist of a vibration-based electrical generator. Said generator then performs both the function of vibration detection and the function of supplying electrical power to the component.

The invention applies particularly well to mobile terminals having a radio interface with a mobile radio telephone network.

Mobile telephones and personal digital assistants including a radio interface, for example of WiFi or Bluetooth type, do not automatically detect the presence of a radio network. This is known in the art. To do this the user must use software to activate the radio interface of their terminal. It is then upon the terminal to scan for and connect to the WiFi or Bluetooth radio network. The change from a GPRS session to a radio session is therefore not effected automatically on detecting a radio network.

It is of course possible to leave the radio interface on all the time in order to effect continuous radio scanning, but given the high power consumption of the radio interface the battery of the mobile terminal would then be discharged in a few hours, rendering the provision of services when mobile impossible.

Another solution would be for the user to activate or de-activate the radio interface of their terminal themselves. However, this assumes that they know when they enter or leave a radio coverage area, which is generally not so. Moreover, this change from one mode to the other would require intervention by the user, which is precisely what the invention aims to avoid.

It would also be possible to add an external terminal positioning element, such as a GPS system or a GSM triangulation system, for example, in order to be able to activate the radio interface when the positioning element indicates that the mobile terminal is entering a radio coverage area. However that method has a number of drawbacks:

GPS positioning is accurate but the device needs to be outdoors in order to pick up the satellite signals better. The device would work more or less well indoors.

the GPS system also consumes power which means the battery life would be considerably reduced.

positioning by GSM triangulation is not very accurate (50 meters (m) to 500 m in an urban environment for radio coverage areas varying from 20 m to 200 m diameter) and consumes power.

It is to remedy these drawbacks that according to the invention said component is a radio-frequency wave detector adapted to control a radio interface of the terminal.

This achieves automatic activation of the radio interface of the mobile terminal when it is in a radio coverage area whose presence is signaled by said radio-frequency wave detector. Conversely, the radio interface is put on standby on leaving the coverage area.

The invention also relates, by way of a particular advantageous application, to a telecommunication system including a communication network having a radio access point able to communicate with a mobile terminal conforming to the above description.

The following description with reference to the appended drawings, provided by way of non-limiting example, explains clearly in what the invention consists and how it can be reduced to practice.

FIG. 1 shows a mobile terminal 10 comprising various components known in the art, namely:

Figure 1:
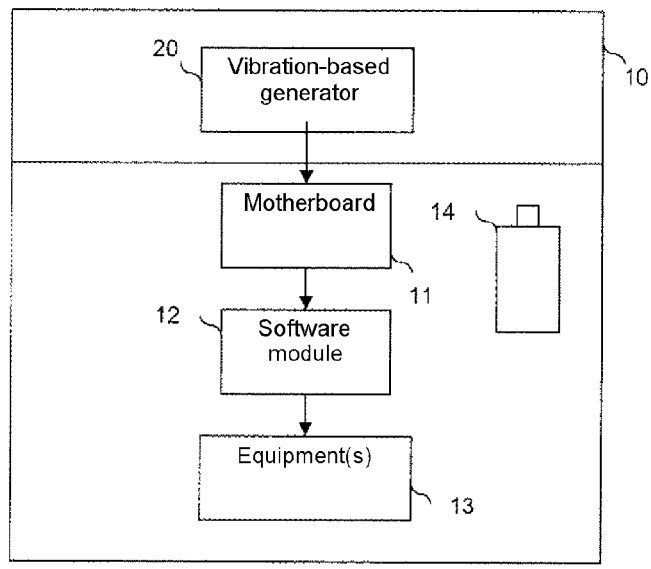
FIG. 1 is a diagram of a mobile terminal equipped with a first embodiment of an automatic power supply system.

- a motherboard 11 carrying all the circuits necessary for the terminal 10 to function;
- a software module 12 comprising applications that provide the user with the services available on the terminal 10;
- one of more equipments 13 providing various functions such as interfacing with a radio network.

All these components are supplied with power by a battery 14. When they are on standby, i.e. inactive, they consume very little power.

As FIG. 1 shows, the mobile terminal 10 further comprises means for automatically supplying power to said components on detection of movement of the terminal 10. In the FIG. 1 embodiment, those power supply means consist of a vibration-based electrical generator 20 able to convert vibratory energy into electrical energy. Said electrical generator 20 is autonomous in the sense that it is not supplied with electrical power by the battery 14 of the terminal. It is situated in the terminal 10 or on a SD or CompactFlash type expansion card inserted into the terminal 10.

Such vibration-based generators are described in the paper by R. Amirtharajah and A. P. Chandrakasan, "Self-Powered Signal Processing Using Vibration-Based Power Generation", IEEE Journal of Solid-State Circuits, Vol. 33, No. 5, May 1998 and in the disclosure of M. A. Cohen, "Micro Generator Powered by Ambient Vibration", UCB Case No.: B04-046, University of Berkeley, Calif.

In the presence of vibrations, i.e. when the terminal 10 is motion, the generator 20 causes the motherboard 11 to be switched from the standby mode to a mode in which it activates the software module 12 which, in turn, activates one or more equipments 13 of the terminal 10, in particular a radio interface, as described in detail later.

If the terminal is switched off, this process is inoperative, being operative only if the terminal is in standby mode or switched on.

If the terminal 10 is in standby mode, the equipment(s) 13 are deactivated and their power consumption is low. The standby state continues until the terminal 10 moves or the user activates its functions.

When the terminal 10 is in motion, the vibration-based electrical generator 20 produces sufficient current to send a movement detection signal to the motherboard 11 of the terminal 10.

On reception of this signal, the battery 14 supplies the various components of the terminal 10 with the electrical power that they need in their active state. The motherboard 11 exits its standby state and invokes the software module 12 to activate appropriately the equipment(s) 13 of the terminal 10.

The software application(s) invoked in this way supervise the equipment(s) 13 and decide when to de-activate them.

When the equipment(s) 13 are de-activated, the corresponding application causes the terminal 10 to return to the standby mode. All the components 11, 12, 13 supplied with power by the battery 14 of the terminal 10 are then dormant, with the power supply disconnected.

If the terminal 10 is switched on, and therefore being used, the equipment(s) 13 can be activated either directly at the initiative of the user according to their requirements or automatically on detection of movement.

Assume that the terminal 10 is switched on and that the equipment(s) 13 are not active.

If the terminal 10 is not in motion, nothing happens in respect of activating these equipment(s).

If the terminal 10 is in motion, the same mechanism as described above for a terminal initially in the standby mode is executed, i.e. the vibration-based electrical generator 20 produces sufficient current to send a movement-detection signal to the motherboard 11 of the terminal 10.

On reception of this signal, the battery 14 supplies the various components of the terminal 10 with the electrical power that they need in their active state. The motherboard 11 exits its standby state and invokes the software module 12 in order to activate appropriately the equipment(s) 13 of the terminal 10.

The software application(s) invoked in this way supervise the equipment(s) 13 and decide when to de-activate them.

When the equipment(s) 13 are de-activated, the corresponding applications go to the standby mode or return to their initial state.

The terminal 10 remains active, however. It switches to the standby mode at the command of the user or after a time-delay and as a function of the standby policy defined by the user's parameter settings.

When the terminal 10 is in standby mode, all the components 11, 12, 13 supplied with power by the battery 14 of the terminal are dormant, with very low power consumption.

Figure 2:
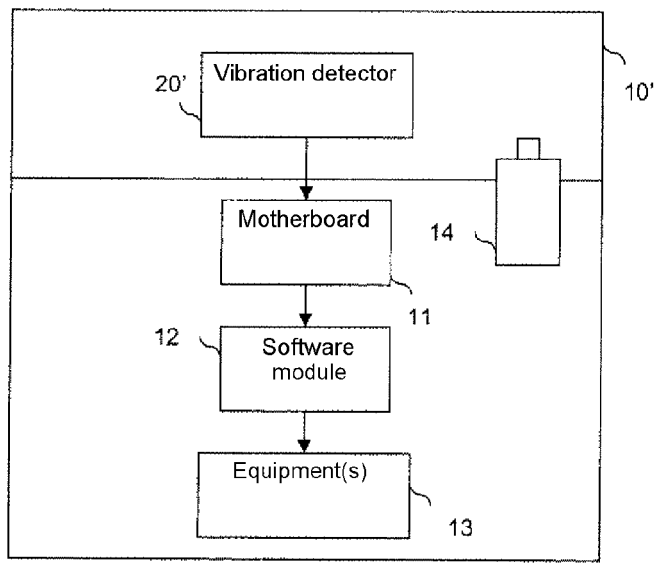
FIG. 2 is a diagram of a mobile terminal equipped with a second embodiment of an automatic power supply system.

FIG. 2 differs from FIG. 1 in that movement detection is not effected by a vibration-based electrical generator but by a vibration detector 20'. This type of detector is available off the shelf, in particular in the Conrad catalogue (www.conrad.fr) under the product reference B200 and in the Selectronic catalogue (www.selectronic.fr) under the product reference 801.

In contrast to the vibration-based generator 20, the vibration detector 20' needs to be supplied with electrical power, in particular by the battery 14 of the terminal 10.

The operation of the terminal 10' from FIG. 2 is identical to that just described with reference to FIG. 1, the movement detection signal here being supplied to the motherboard 11 by said vibration detector 20'.

To summarize, the embodiments of FIGS. 1 and 2 automatically activate the functions of the terminal when the terminal is:

in use, and therefore in motion, held in the hand of the user;
in motion, in the pocket of the user when moving around.

The invention therefore has the advantage of automatically activating useful functions only when the terminal is in use or in motion, thus saving power by automatically putting those functions on standby the rest of the time, when the terminal is immobile, for example put down on a table.

Use or motion of the terminal is detected without consuming power from the terminal when using the vibration-based generator 20, or with very low power consumption when using the vibration detector 20'.

The terminal is activated only when it is in use.

Figure 3:
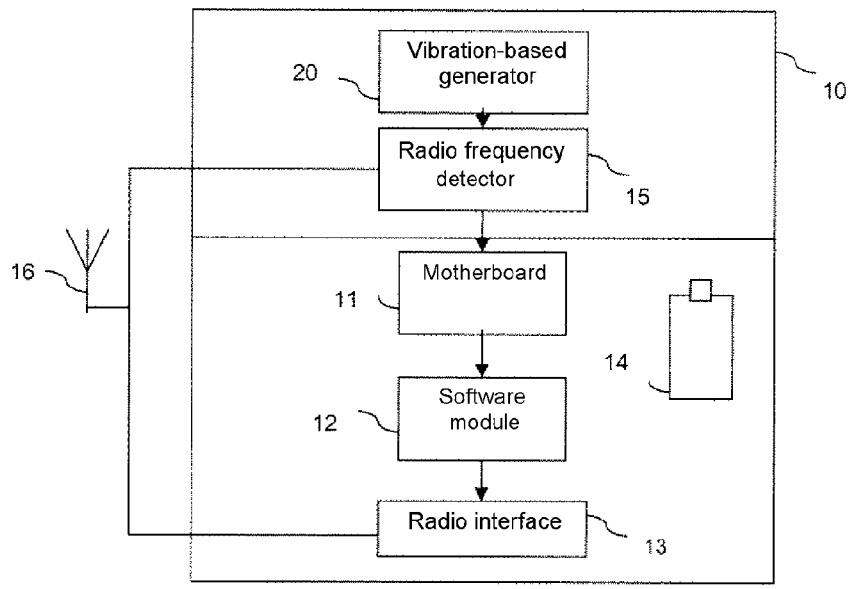
FIG. 3 is a diagram of a first embodiment of a mobile terminal equipped with a radio-frequency wave detector.
Figure 4:
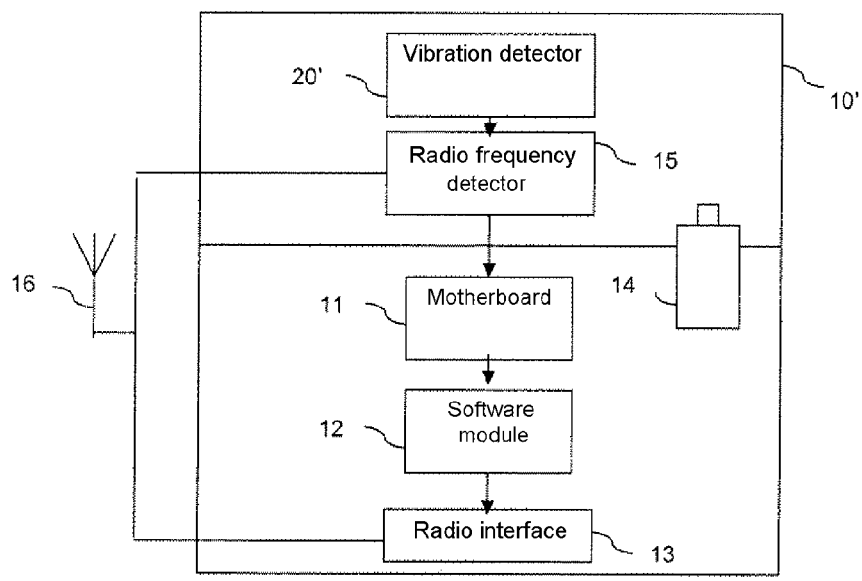
FIG. 4 is a diagram of a second embodiment of a mobile terminal equipped with a radio-frequency wave detector.

FIGS. 3 and 4 show an application of the invention to a terminal 10 equipped with a radio interface 13 enabling said terminal to be connected to a radio network of frequency F, in particular a WiFi or Bluetooth network.

The mobile terminal 10 from FIG. 3 comprises various components known in the art, namely:

- a motherboard 11 carrying all the circuits necessary for the terminal 10 to function;
- a software module 12 comprising applications that provide the user with the services available on the terminal 10;
- the radio interface 13;

a detector of radio waves at the frequency F adapted to control said radio interface 13;

an antenna 16 for amplifying radio waves directed to the detector 15 and the signal received from a radio station directed to the interface 13.

A radio-frequency wave detector suitable for the invention is distributed by Linear Technology Corporation under the general product reference LTC5505-X.

All these components, except the antenna 16 and the radio wave detector 15, are supplied with power by a battery 14. When they are on standby, i.e. inactive, they consume very little power.

As FIG. 3 shows, the mobile terminal 10 also comprises means for automatically supplying power to the radio wave detector 15 on detection of movement of the terminal 10. In the FIG. 3 embodiment, these power supply means consist of a vibration-based electrical generator 20 of the same type as that described with reference to FIG. 1, able to convert vibratory energy into electrical energy. Said electrical generator 20 is autonomous in the sense that it is not supplied with electrical power by the battery 14 of the terminal. It is situated in the terminal 10 or on an SD or CompactFlash type expansion card inserted into the terminal 10.

The radio wave detector 15 is connected to the motherboard 11 of the terminal 10.

In the presence of vibrations, i.e. when the terminal 10 is in motion, the generator 20 supplies power to the radio wave detector 15 which, on detecting a radio wave at the frequency F, switches the motherboard 11 from the standby mode to a mode in which it activates the software module 12 which in turn activates the radio interface 13 of the terminal 10.

If the terminal 10 is switched off, this process is inoperative, being operative only when the terminal is in standby mode or switched on.

If the terminal 10 is in standby mode, the radio interface 13 is de-activated and its power consumption is very low. The standby state continues until the terminal 10 moves or the user activates its functions.

When the terminal 10 is in motion, the vibration-based electrical generator 20 produces a current for supplying power to and activating the radio wave detector 15 locked onto the frequency F. If it detects an electromagnetic field of frequency F, a signal is sent to the motherboard 11 of the terminal 10.

On reception of this signal, the motherboard 11 exits its standby state and invokes the software module 12 in order to activate appropriately the radio interface 13 of the terminal 10. The connection to the radio network corresponding to the frequency F detected is then effected.

The software application for processing data on the radio link can send and receive radio data over the radio link set up in this way as soon as it is operational.

The software application supervises the radio interface 13 and detects loss of the radio connection on leaving the coverage area.

If the radio connection is lost, the application de-activates the radio interface 13 and switches the terminal into standby mode following a time delay. All the components supplied with power by the battery 14 of the terminal 10 are then dormant.

If the terminal 10 is switched on, and therefore in use, the radio interface 13 can be activated either at the initiative of the user or automatically on detection of movement.

Assume that the terminal 10 is switched on and that the radio interface 13 is not active.

If the terminal 10 is not in motion, nothing happens insofar as activation of the radio interface 13 is concerned.

If the terminal 10 is in motion, the mechanism described above for a terminal initially on standby is executed, namely the vibration-based electrical generator 20 produces sufficient current to supply power and activate the radio wave detector 15 locked onto the frequency F. If it detects an electromagnetic field of frequency F, a signal is sent to the motherboard 11 of the terminal 10.

On reception of this signal, the motherboard 11 exits its standby state and invokes the software module 12 in order to activate appropriately the radio interface 13 of the terminal 10. The connection to the radio network corresponding to the frequency F detected is then effected.

The software application for processing data on the radio link can send and receive radio data over the radio link set up in this way as soon as it is operational.

The software application supervises the radio interface 13 and detects loss of the radio connection on leaving the coverage area.

If the radio connection is lost, the application de-activates the radio interface 13 after a time delay. The application goes to standby or returns to its initial state.

The terminal 10 remains active, however. It switches to the standby mode at the command of the user or after a time delay and as a function of the standby policy defined by the user's parameter settings.

If the terminal 10 is in standby mode, all the components 11, 12, 13 supplied with power by the battery 14 of the terminal are dormant, with very low power consumption.

The FIG. 3 embodiment therefore has the advantage of detecting wireless networks of frequency F when the terminal is in motion without consuming power from the terminal and without intervention of the user.

The power consumed to detect a radio network comes entirely from the vibration-based electrical generator 20 and no consumption of power from the terminal 10 is necessary.

The terminal is activated only when the radio network is detected.

If the terminal 10 is in standby mode when a radio wave at frequency F is detected, only the functions essential for assuring the service, namely the radio interface, are activated at the time of radio detection and de-activated on loss of radio connectivity. To minimize power consumption the display of the terminal 10 is not activated.

If the terminal is switched on and being used at the time of radio detection, it is left in that state on loss of the radio connection. Going to standby will be at the initiative of the user or after a preset time delay.

FIG. 4 differs from FIG. 3 in that movement is detected not by a vibration-based electrical generator but by a vibration detector 20' of the same type as described with reference to FIG. 2. The vibration detector 20' is supplied with power at all times by the battery 14 of the terminal 10', whereas the detector 15 of radio waves at the frequency F is supplied with power by the battery 14 only on detection of movement of the terminal 10' by the vibration detector 20'.

The terminal 10' of FIG. 4 operates in exactly the same way as that which has just been described with reference to FIG. 3, the radio wave detection signal here being supplied to the motherboard 11 by said radio wave detector 15 when it is supplied with power by the battery 14 on detection of movement of the terminal by the vibration detector 20' and if it detects radio a wave at the frequency F.

By authorizing activation of the terminal only if a radio coverage area is detected, the FIG. 4 embodiment saves a considerable amount of power if the terminal 10' is not being used. The vibration detector 20' coupled to the radio wave detector 15 consumes less power than the radio interface 13.

If the terminal is not in motion, only the vibration detector 20' is supplied with power by the battery 14.

As soon as the terminal 10' is in motion, the radio wave detector 15 is supplied with power by the battery 14.

If the terminal 10' is in standby mode at the time of detection, only the functions essential for assuring the service, namely the radio interface 13, are activated on detecting the presence of a radio network at frequency F and de-activated on loss of radio connectivity.

If the terminal is switched on and being used at the time of radio detection, it is left in that state on loss of the radio connection. Going to standby will at the initiative of the user or after a preset time delay.

The invention claimed is:

1. A mobile terminal, comprising:
    a radio-frequency wave detector to, upon detection of a radio wave of a predetermined frequency, send to a motherboard of said terminal a signal to activate said motherboard from a standby mode;
    a movement detection means for detecting movement of said mobile terminal;
    an automatic power supply means for supplying power to said radio-frequency wave detector upon detection of movement of said mobile terminal by said movement detection means, said automatic power supply means being controlled by said movement detection means.

2. The mobile terminal according to claim 1, wherein said automatic power supply means includes a battery adapted to be connected to said motherboard by said movement detection means.

3. The mobile terminal according to claim 2, wherein said battery is a power supply battery of the terminal.

4. The mobile terminal according to claim 2, wherein said movement detection means includes a vibration detector supplied with power by said battery.

5. The mobile terminal according to claim 1, further comprising:
    a primary power source to provide power to said motherboard upon activation of said motherboard,
    wherein said movement detection means includes an autonomous vibration detector that does not receive power from said primary source.

6. A mobile terminal according to claim 5, wherein said autonomous vibration detector is a vibration based electrical generator configured to convert vibrations into electrical energy supplied to the radio-frequency wave detector upon detection of movement of said mobile terminal.

7. The mobile terminal according to claim 1, wherein said automatic power supply means includes of a vibration based electrical generator.

8. The mobile terminal according to claim 1, further comprising:
    a radio interface for connecting said terminal to a radio network and a module for activating said radio interface further to an activation of said motherboard.

9. A telecommunication system including a communication network having a radio access point able to communicate with a mobile terminal according to claim 1.

10. A mobile terminal, comprising:
    a radio-frequency wave detector to, upon detection of a radio wave of a predetermined frequency, send to a motherboard of said terminal a signal to activate said motherboard from a standby mode;
    a movement detection device to detect movement of said mobile terminal; and
    an automatic power supply device to supply power to said radio-frequency wave detector upon detection of movement of said mobile terminal by said movement detection device, said automatic power supply device being controlled by said movement detection device.

11. The mobile terminal according to claim 10, wherein said automatic power supply device includes a battery adapted to be connected to said motherboard by said movement detection device.

12. The mobile terminal according to claim 11, wherein said battery is a power supply battery of the terminal.

13. The mobile terminal according to claim 11, wherein said movement detection device includes a vibration detector supplied with power by said battery.

14. The mobile terminal according to claim 10, further comprising:
    a primary power source to provide power to said motherboard upon activation of said motherboard,
    wherein said movement detection device includes an autonomous vibration detector that does not receive power from said primary source.

15. The mobile terminal according to claim 14, wherein said autonomous vibration detector is a vibration based electrical generator configured to convert vibrations into electrical energy supplied to the radio-frequency wave detector upon detection of movement of said mobile terminal.

16. The mobile terminal according to claim 10, wherein said automatic power supply device includes a vibration based electrical generator.

17. The mobile terminal according to claim 10, further comprising:
    a radio interface for connecting said terminal to a radio network and a module for activating said radio interface further to an activation of said motherboard.

18. A telecommunication system including a communication network having a radio access point able to communicate with a mobile terminal according to claim 10.

* * * * *

UNITED STATES PATENT AND TRADEMARK OFFICE
CERTIFICATE OF CORRECTION

PATENT NO. : 8,255,008 B1
APPLICATION NO. : 11/995463
DATED : August 28, 2012
INVENTOR(S) : Gilles Chanteau et al.

Page 1 of 1

It is certified that error appears in the above-identified patent and that said Letters Patent is hereby corrected as shown below:

In the Claims

In Column 7, Claim 7:

In line 49, delete "of"

Signed and Sealed this
Sixteenth Day of June, 2015

Michelle K. Lee
*Director of the United States Patent and Trademark Office*